US007388487B2

(12) United States Patent
Smith

(10) Patent No.: US 7,388,487 B2
(45) Date of Patent: *Jun. 17, 2008

(54) METHOD OF ELIMINATING IMPACT/SHOCK RELATED FALSE ALARMS IN AN ACOUSTICAL GLASSBREAK DETECTOR

(75) Inventor: Richard A Smith, El Dorado Hills, CA (US)

(73) Assignee: Honeywell International, Inc., Morristown, NJ (US)

( * ) Notice: Subject to any disclaimer, the term of this patent is extended or adjusted under 35 U.S.C. 154(b) by 502 days.

This patent is subject to a terminal disclaimer.

(21) Appl. No.: 10/871,386

(22) Filed: Jun. 17, 2004

(65) Prior Publication Data

US 2007/0008125 A1    Jan. 11, 2007

(51) Int. Cl.
*G08B 13/00* (2006.01)
(52) U.S. Cl. ...................... 340/566; 340/540; 340/541; 340/544; 340/550; 340/426.27
(58) Field of Classification Search ................ 340/566, 340/540, 541, 544, 550, 426.27
See application file for complete search history.

(56) References Cited

U.S. PATENT DOCUMENTS

| 5,192,931 A | 3/1993 | Smith et al. | |
| 5,471,195 A * | 11/1995 | Rickman | 340/550 |
| 5,543,783 A * | 8/1996 | Clark et al. | 340/550 |
| 5,796,336 A * | 8/1998 | Ishino et al. | 340/566 |
| 6,538,570 B1 | 3/2003 | Smith | |

* cited by examiner

*Primary Examiner*—Tai Nguyen
(74) *Attorney, Agent, or Firm*—Dalia S. Grimberg; John Beninati; Robert S. Smith

(57) ABSTRACT

Apparatus for detecting the breaking of a contact-sensitive surface includes an acoustic, shock, and vibration transducer, a detector circuit responsive to the transducer for detecting an acoustic wave resulting from a contact force applied to the surface and generating a signal, a support for the transducer, and the means for disqualifying a contact force to the support as a breakage event that relies on differentiation of the speed with which a shock wave travels through a solid material versus the speed with which an acoustic wave travels through air. The transducer may include a front electret condenser microphone and in some preferred embodiments the microphone does not have a preamplifier associated therewith. The invention also includes the method for detecting the breaking of a contact-sensitive surface that includes providing an acoustic, shock, and vibration transducer, providing a support for the transducer, providing a detector circuit responsive to the transducer for detecting an acoustic wave resulting from a contact force applied to the surface and generating a signal; and providing means for disqualifying a contact force to the support as a breakage event that relies on differentiation of the speed with which a shock wave travels through a solid material versus the speed with which an acoustic wave travels through air.

23 Claims, 6 Drawing Sheets

METHOD OF ELIMINATING IMPACT/SHOCK RELATED FALSE ALARMS IN AN ACOUSTICAL GLASSBREAK DETECTOR

NOTICE OF MATERIAL SUBJECT TO COPYRIGHT PROTECTION

Portions of the material in this patent document are subject to copyright protection under the copyright laws of the United States and of other countries. The owner of the copyright has no objection to the facsimile reproduction by anyone of the patent document or the patent disclosure, as it appears in the United States Patent and Trademark Office file or records, but otherwise reserves all copyrights whatsoever.

BACKGROUND OF THE INVENTION

The invention relates to alarm systems and particularly to acoustical glassbreak detectors. Acoustical glassbreak detectors typically include an omnidirectional microphone. For the purposes of this application the side of such microphones on which the microphone is most sensitive is referred to herein as the front and the opposite side of such microphones is referred to herein as the back. Known acoustic glassbreak detectors have experienced problems with false alarming in response to strong impacts to the surface on which the detector is mounted when the impact is at the back or behind the microphone element. This occurs in the CE Oak Beam Impact Test.

The prior art includes U.S. Pat. No. 5,192,931 issued on Mar. 9, 1993 to Richard A. Smith, the applicant herein, and Christopher A. Bernhardt. The disclosure of this patent is incorporated by reference herein.

The applicant herein was also issued U.S. Pat. No. 6,538,570 on Mar. 25, 2003. The present invention provides an improvement over the apparatus described therein. The apparatus in method described therein is highly effective. However, in some cases false alarms may occur as the result of an impact to the surface on which the microphone sensor on a part of that surface which is behind or opposite to the direction in which the microphone sensor is most sensitive.

SUMMARY OF THE INVENTION

It is an object of the present invention to provide a still more effective in sensing glass break occurrences.

Still another object of the present invention is to provide a capability to prevent false alarms from occurring as a result of impacts to the surface directly behind the part of the sensor which is most sensitive to acoustic, shock and impact.

It is now been found that these and other object the invention may be attained in a wide variety of apparatus for detecting the breaking of a contact-sensitive surface. Such apparatus will include an acoustic, shock, and vibration transducer, a detector circuit responsive to the transducer for detecting an acoustic wave resulting from a contact force applied to the surface and generating a signal, a support for the transducer, and the means for disqualifying a contact force to the support as a breakage event that relies on differentiation of the speed with which a shock wave travels through a solid material versus the speed with which an acoustic wave travels through air.

In some forms of the invention the means for disqualifying disqualifies the event if the absolute value of the microphone signal is greater than a predetermined value, relative to analog ground, at the instant a mid-range band-passed amplified representation of the signal initiates the beginning of event processing.

The transducer may include a front electret condenser microphone that produces a negative signal in response to a positive pressure or shock stimulus. This transducer may cooperate with a preamplifier. The preamplifier may be a FET preamplifier. In some preferred embodiments the microphone does not have a preamplifier associated therewith.

Other embodiments utilize a back electret microphone that may cooperate with a preamplifier. In some preferred embodiments the microphone does not have a preamplifier associated therewith.

The invention also includes the method for detecting the breaking of a contact-sensitive surface that includes providing an acoustic, shock, and vibration transducer, providing a support for the transducer, providing a detector circuit responsive to the transducer for detecting an acoustic wave resulting from a contact force applied to the surface and generating a signal; and providing means for disqualifying a contact force to the support as a breakage event that relies on differentiation of the speed with which a shock wave travels through a solid material versus the speed with which an acoustic wave travels through air.

The method may include disqualifying an event if the absolute value of the microphone signal is greater than a predetermined value, relative to analog ground, at the instant a mid-range band-passed amplified representation of the signal initiates the beginning of event processing. The method may include providing a front electret condenser microphone that produces a negative signal in response to a positive pressure or shock stimulus and may include providing apparatus that does not include any preamplifier associated therewith. Other embodiments may include a preamplifier such as a FET preamplifier.

Other methods may include providing a back electret microphone with or without an associated preamplifier.

BRIEF DESCRIPTION OF THE DRAWING

The invention will be better understood by reference to the accompanying drawing in which.

DESCRIPTION OF THE PREFERRED EMBODIMENTS

U.S. Pat. No. 6,538,570 issued to the applicant herein on Mar. 25, 2003. The apparatus of the present invention will be better understood by reference to the disclosure therein which is incorporated herein by reference.

The immediately following part of this description will be understood to provide an overall description of the apparatus. Subsequent parts of this description will describe the features of the invention specifically directed to providing a capability of preventing false alarms as the result of an impact to the surface directly behind the sensor.

Figure 1:
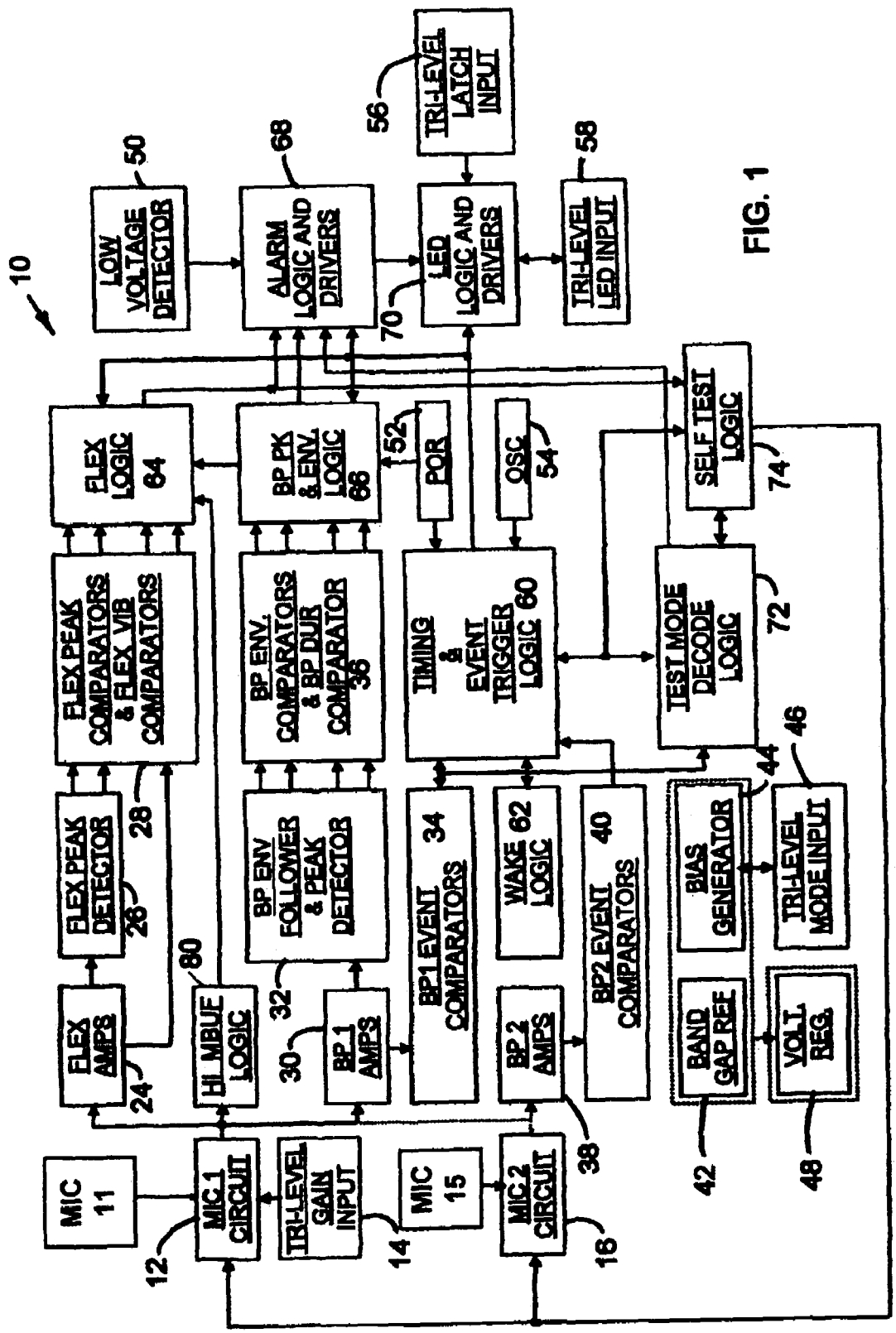
FIG. 1 is a block diagram of system electronics within the glass-breakage detector system according to the present invention.

A preferred embodiment of the glass-breakage detector employing a highly-selective method of glass flex discrimination is embodied in the apparatus generally shown in FIG. 1. It will be appreciated that the apparatus may vary as to configuration and as to details of the parts without departing from the basic concepts as disclosed herein.

1. Overview

The acoustic detection circuit and method of the present invention provides improved discrimination of common non-glass-breakage events to reduce false alarms. Alarm systems are typified within the industry as described within U.S. Pat. No. 5,192,931 issued Mar. 9, 1993 to Smith et al., U.S. Pat. No. 5,510,767 issued Apr. 23, 1996 to Smith, and U.S. Pat. No. 5,471,195 issued Nov. 28, 1995 to Rickman, which are incorporated herein by reference.

FIG. 1 is an embodiment of the glass-breakage detector electronics 10. The glass-breakage detector may be utilized within a variety of both hardwired and wireless alarm applications. Typically, the glass-breakage detector is employed for sensing the breakage of glass windows and the embodiment described is configured With threshold and timing values specific for the detection of framed-glass panel breakage. By adjusting the detection parameters, the present invention may alternatively be utilized for detecting numerous forms of shattered panel breakage that can occur as a result of a sufficient contact force being applied to a contact-sensitive panel surface. Therefore, the present invention is not to be considered limited in use to the sensing of glass-breakage.

FIG. 1 shows an embodiment of the glass-breakage detector circuit 10 as a mixed signal analog-digital ASIC providing real-time parallel event processing in both the analog and digital domains. Due to the often harsh environment of alarm system applications, each of the input and output pins of the ASIC preferably has at least 2 kV of ESD (Electro-Static Discharge) protection. It will be appreciated that alternative embodiments may be implemented utilizing a variety of electronic design forms, without departing from the underlying inventive principles.

Numerous acronyms are used in the following text which is explained within the body of the description, a summary listing of acronyms is provided for reference in Table 1.

2. Description of Analog Functions within the Circuit

Referring to the glass-breakage detector circuit 10 of FIG. 1, an acoustic transducer, such as a microphone 11, is received as input by a front end buffer of a first microphone input circuit 12. The first microphone input circuit 12 preferably comprises a means for scaling the microphone input, exemplified herein as a rail-to-rail buffer amplifier which includes a small network of switched capacitors parallel to the microphone input to allow for trimming of the microphone sensitivity.

Microphone sensitivity is set by a tri-state gain input 14, which is provided as an external signal to the ASIC. The gain control configures the inputs to achieve narrow sensitivity variation over a wide range of microphones. The three preferred attenuation states are: non-attenuated, a first level of attenuation nominally providing 1.6-2.0 dB of attenuation, a second level of attenuation nominally providing 3.5-4.0 dB of attenuation, a third level of attenuation of nominally 9 dB; these values are also summarized in Table 2.

The input from an optional second acoustic transducer/microphone 15 may additionally be provided for improving discrimination of non-glass-breakage events by picking up a "back" transducer signal to allow performing "time of arrival" signal processing, which is described in detail within U.S. Pat. No. 5,471,195 by Rickman. The second transducer 15 is input to a second microphone input circuit 16 which contains a signal amplifier and conditioning circuitry.

The acoustical signal from the first microphone circuit 12 is processed by frequency-selective signal processing sections that each process components of the acoustical signal that exists within a specific pass-band, comprising a low-frequency section, medium-frequency section, and optionally a high-frequency section.

Figure 2:
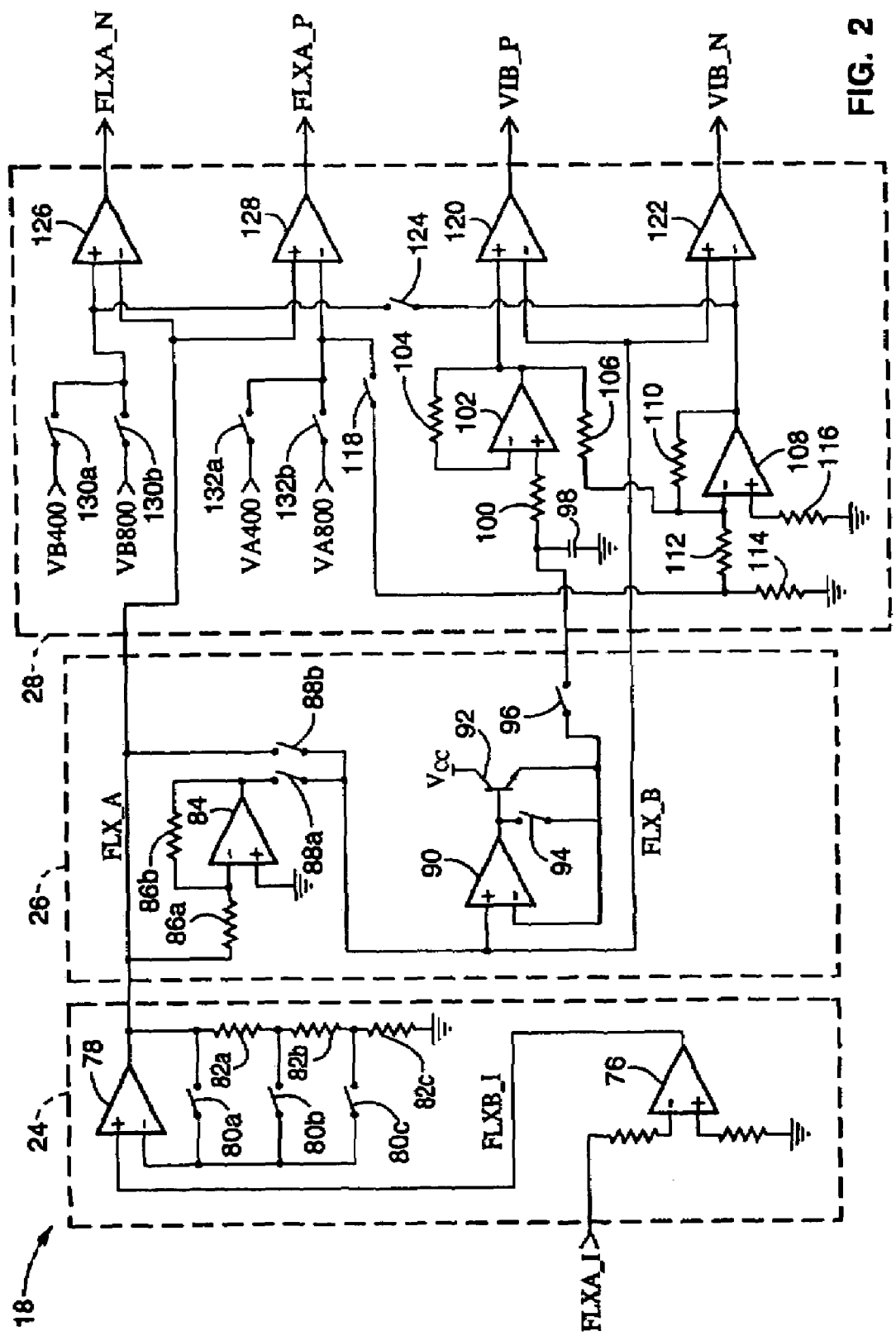
FIG. 2 is a simplified schematic of the low-frequency signal processing section within FIG. 1.

The low-frequency signal processing section comprises flex circuit amplifiers 24, flex peak detectors 26, and comparators for flex and flex peak 28. FIG. 2 is a simplified schematic, provided by way of example and not of limitation, which illustrates the primary circuit elements and various analog switching within an embodiment of the low-frequency signal processing section of FIG. 1. The low-frequency signal processing section in combination with the flex logic 64, processes the low frequencies generally associated with the flexing of a panel of material, such as a glass window, and therefore is also referred to as the "flex" circuit.

Referring to FIG. 2, the flex circuit amplifiers 24 provide amplification and active low-frequency filtering of the signals from the first microphone circuit. Amplifier 76 provides amplification and active low-frequency filtering of the first microphone signal FLXA.sup.—I that is subsequently received by amplifier 78 which provides programmable gain as selected by switches 80a-80c on a ladder of feedback resistors 82a-82c.

The flex peak detector stage 26 stores the absolute value of the first flex peak. In order to detect this flex peak, a set of threshold signal levels are generated for positive and negative thresholds, while another stage provides storage of the peak, and a final stage inverts this signal when necessary to generate an absolute value of the flex peak. Specifically, the signal FLX_A is provided as a signal to an inverting amplifier 84 with feedback resistors 86a, 86b. A peak detector circuit receives a signal FLX_B which is provided through switches 88a, 88b as either the FLX_A signal, or the inversion of the FLX_A signal. The peak detector circuit comprises op-amp 90, bipolar transistor 92, switches 94, 96 and capacitor 98 on which the absolute value peak is stored.

The comparator section for flex and flex peak 28, provide for testing of numerous flex signal conditions. The positive and negative going flex signal can be compared against predetermined thresholds. The negative and positive flex signal phase relationships can be determined. A comparison of the flex signal in relation to the absolute value of the first flex peak may be provided. Referring to FIG. 2, op-amp 102 buffers the peak voltage stored on capacitor 98 through resistor 100 to create a direct-current signal by dividing resistors 104, 106 to provide a flex positive vibration threshold. Op-amp 108 is configured with resistors 110, 112, 114, 116, which invert and condition the direct-current signal from op-amp 102 for the negative threshold comparison. Switch 118 provides for the selection of threshold reference signals with the input to the inverting amplifier 108. Two comparators provide a bounded comparison of the flex signal, with comparator 120 detecting positive excursions above the established threshold, and comparator 122 detecting negative going excursions below the threshold. Switch 124 allows the signal output from comparator 108 to be selected as a third input threshold for comparator 126. Another set of comparators provide a bounded comparison of the flex signal relative to fixed thresholds, which enables the logic to determine the phase relationships of the event signals. Comparator 126 compares the FLX_A signal for negative excursion below threshold voltage signal VB400 or VB800; similarly comparator 128 compares FLX_A for a positive excursion above threshold voltage signals VA400 or VA800.

Referring again to FIG. 1, the medium and high-frequency signal processing sections will be described solely in reference to the block diagram of FIG. 1, as they contain similar analog circuitry as described for the low-frequency flex circuit whose internal circuitry was previously described in detail in reference to FIG. 2.

The medium-frequency signal processing section, contains a band-pass filter with amplification 30 of mid-range acoustical frequencies. The band-pass envelope followers and peak detector 32, track band-pass average voltage (BAVA) and band-pass average peak (BAVA_PK). Internally, the band-pass envelope followers and peak detector may be implemented as one op-amp which provides the drive of BAV capacitance for the direct-current envelope (BAV) of the BP1 signal, while another op-amp section provides the voltage for peak detection of the BAV signal. A non-inverting op-amp is used as a buffer for direct-current attenuation of the BAVA_PK signal to establish a threshold for a duration determination for the BAV signal.

The BP1 band-pass event comparators 34, provide a mechanism for determining the beginning of an acoustic event. The glass-breakage detector is normally in a reset state wherein no discernable acoustic events are taking place. An acoustic event is considered to occur when the glass is moved by any force, such as wind, touch, or a hammer. Upon encountering an acoustic event, the glass-breakage detector validates the measured acoustical signals to determine if the event constitutes a breakage. BP1 event comparators 34 compare the medium-frequency band-pass acoustical signal with a predetermined threshold thereby allowing subsequent logic circuitry to determine the beginning of the event and the initial phase dominance of the constituent event signals. Upon event validation, the event comparator generates an event trigger which initiates event timing when it engages the wake up logic 62 for circuitry which is in a low-power or sleep mode.

The BP1 band-pass envelope comparators and band-pass peak comparator 36, provide for measuring the band-pass average voltage (BAV) and the duration of the BP1 medium-frequency band-pass signal. The band-pass envelope comparator detects the BAV as it exceeds a preset threshold, thereby allowing the logic to determine the envelope characteristics of the BP1 signal. The band-pass envelope duration comparator detects the relationship of the BAV signal in relation to a threshold of BAVA_PK/10, which further enables the logic to determine the envelope duration of the BP1 signal.

The high-frequency signal processing section, may receive input from either the first microphone circuit 12, or the optional second microphone circuit 16, and provides a high-frequency band-pass BP2 amplifier 38. Typically, the BP2 amplifier 38 within the high-frequency signal processing section, is used for conditioning data from the first microphone circuit 12 if the system is not in "ZONE"-mode, or optionally from the second microphone circuit 16 when "ZONE" mode is enabled.

A band-pass event comparator 40 provides a high-frequency event threshold comparison utilized in conjunction with BP1 event comparator 34 to provide dual-triggering of acoustical events to improve event recognition. Utilizing a pair of comparator circuits provides for the detection of high-frequency signal amplitudes, either positive or negative, in relation to the predetermined absolute threshold. The BP2 event comparator 40 provides an output which enables logic to determine the beginning of the event and a mechanism for providing the "time-of-arrival" determination when the device is in "ZONE" mode.

Additional analog circuits are preferably contained within the ASIC to provide numerous support functions. A bandgap reference 42 provides a fixed and stable voltage reference within the ASIC for biasing the op-amps and setting the relative thresholds of the comparators. The bandgap reference 42 is preferably comprised of a bandgap reference and three op-amps used for the creation of additional positive and negative voltages. The bandgap reference employed within this embodiment has a nominal voltage of 1.25 volts +/−5% and draws only sufficient current for maintaining a stable reference voltage.

Bias currents are supplied for the op-amp current mirrors by a controllable bias generator 44. The bias generator is preferably comprised of multiple transistors that translate the reference voltage into current which supplies the required current mirrors of the op-amps. A tri-state mode input 46 controls the mode of the bias generator 44, thereby allowing the bias voltage to be set according to the mode of the system. The three input states of the tri-state mode input are: a high state for setting "ZONE", a high-impedance state for setting normal sensitivity, and a low state for setting an input sensitivity reduction of 3-4 dB. These three modes of the tri-state input 46 are listed in Table 3.

Regulated power is supplied to the circuitry by means of the voltage regulator 48. The regulator circuit provides $V_{dd}$ regulation such that the regulated voltage is 5.5 volts +/−10% in hardwired mode, and 3.3 volts +/−10% in wireless mode. The voltage regulator has an output which controls a linear regulation transistor located off-chip, and a feedback sense input that senses the $V_{dd}$ from the regulated $V_{dd}$ provided by the off-chip regulation transistor. The voltage regulator is preferably comprised of an op-amp, configured as a voltage follower, and a voltage divider which divides down V.sub.dd for sense feedback. A low supply voltage detector 50, is incorporated within the ASIC to compare the actual V.sub.dd against a low voltage threshold, and to signal any significant excursion thereof. The low voltage threshold in the hardwired mode is set for 4.17 volts +/−10%, while the threshold in wireless mode is set for 2.8 volts +/−10%. Since the V.sub.dd voltage of the system may drop as a result of tampering, the low voltage detector signals to the alarm logic that a low voltage condition exists so that the supply voltage condition may be indicated.

A power-on-reset (POR) circuit 52 provides a simultaneous reset to circuit elements as a result of a power transition. The power-on-reset circuit 52 is split into two separate reset phases, the first of which is a V.sub.dd dependent power-on-reset, and the second is a time dependent POR. The V.sub.dd dependent POR starts up the voltage regulator and triggers the time dependent POR. The time dependent POR insures that logic circuits within the ASIC are held in reset for a sufficient duration to assure stabilization of analog circuitry before the system commences monitoring for acoustic events.

An oscillator circuit 54 provides a drive circuit for a quartz crystal timing element, and feedback to provide for stable oscillation thereof. The oscillator circuit, with the associated external crystal, generates the fundamental clock frequency of the ASIC upon which all circuit timing is based.

A tri-state LED enable input 56, controls the active states of the external LEDs driven by the ASIC. This external input has three input states: a high state which disables the LEDs, a low state with enables the LEDs, and a high-impedance state which enables setup processing or enabling of the LEDs. Table 4 lists the three states of the LED control input.

A tri-state latch input 58 provides external control of the latch status for the alarm LED and the selection of either hardwired, or wireless mode. The latch input has three states: a high state which selects a non-latched alarm LED in hardwired mode, a low state which selects latched LEDs in hardwired mode, and a high-impedance state which selects non-latching LEDs in wireless mode. Table 5 lists the three states of the latch control input.

3. Description of Digital Functions within the Circuit

Referring again to FIG. 1, the following describes the digital functions within the ASIC of this embodiment of the present invention. A timing section 60 provides for timing of events which occur subsequent to the event trigger. All events subsequent to the trigger are timed in relation to the event trigger. When an event trigger occurs, the processing within the ASIC is enabled for a fixed period of time (typically 156 ms) and measurements of time, which preferably provides at least twenty-four bits of resolution within the ASIC, are performed as referenced to the event trigger. If the ASIC is in "ZONE" mode, the timing section 60 additionally detects the time of arrival for both the "front" and "back" microphone signals in a priority fashion.

Another time related function is provided by the wake-up logic circuitry 62, which controls selection of low-power modes for the op-amps and comparators when no valid event trigger has been detected. After the event trigger occurs, the op-amps are awakened and kept awake by the wake-up logic only for a sufficient duration to allow stabilization of the op-amps and to allow performing the necessary signal amplification or conditioning. A logic low on the wake signal from the wake logic circuitry 62 causes the op-amps to enter the low-power, or sleep, mode.

The low-frequency signal processing section, processes the lower acoustic frequencies associated with panel flexing which are interpreted by a flex logic circuit 64.

Band-pass peak and band-pass averaging logic 66 provide for processing of the signals from the medium-frequency signal processing section. (The processing sections of the three frequency ranges follow processing methods which will be described subsequently.)

Alarm logic and drivers 68, carry out qualifying of the signals from all digital processing blocks at the end of the event processing time-window, or interval (approximately 31 milliseconds from valid event trigger), and generates the status of various alarm conditions. Logic and LED drivers 70, generate the signals for driving the status LEDs, which indicate the status of the system and preferably display: the event trigger, test mode, self-test status, alarm status, alarm memory status, trouble status, low battery status, and the flex signal amplitude. A number of rules determine the anticipated state of the LEDs within this preferred embodiment.

Active LEDs are modulated at high-frequency and low duty cycles to render a power savings. Multiple active LEDs are driven out of phase with one another (multiplexed) to reduce the peak power and reduce supply fluctuations. Alarm memory is recalled by an event detection, such as an audio verification which could be initiated for example by a hand clap. This alarm memory is preferably displayed on the red LED as a flash for about five seconds. The alarm memory is reset by the occurrence of a power-on-reset, a test mode activation, or a remote self-test request. The LEDs can be enabled or disabled remotely, and additionally may be controlled by a circuit tester connected to the ASIC when the devices are set into a "SMART" mode. An optional yellow LED indicates the presence of a low-frequency flex signal of sufficient amplitude. When the LEDs are disabled, they remain in an off state for all "Normal" conditions, yet are enabled for the power-on self-test mode. Table 6 lists the states for the LEDs within the glass-breakage detector.

The ASIC is preferably provided with test mode logic that facilitates testing of ASIC internals. Test mode decode logic 72, distinguishes activation codes sensed via the microphone input circuits. Upon successfully distinguishing an activation code, "Test Mode" is entered such that test processing can be performed for approximately five minutes. Alternatively, when in "SMART" mode; upon receipt of a valid activation code that occurs within two seconds after a valid code has been received to exit test mode, the LED enable state is toggled.

A broad spectrum of testing within the circuit is provided by self-test logic 74, which allows for driving of the microphone buffer inputs with a self-test pattern that is processed in the analog and digital sections. This self-test allows verification of analog and digital processing to assure normal circuit functionality. Upon self-test failure a trouble status indication is latched and displayed on the LEDs. The self-test failure is subsequently reset by exiting and entering test mode, or alternatively by resetting circuit power. Self-test is performed on power-up, and may additionally be initiated by an external input signal (not shown).

4. Description of Signal Processing Methods

This section describes two signal processing methods, "A" and "B", utilized within the ASIC for validation of breakage events. Methods "A" and "B" are based on various specific signal conditions, thresholds, and timing conditions which may exist within the ASIC during operation. The exemplified circuitry is matched with the timing and threshold parameters of the methods toward detection and discrimination which is optimized for framed glass-breakage events. Although specific times and thresholds are described for the embodiment, these do not in any way limit the breadth of the invention described; hardware, timing, and threshold variations can be supported without departing from the disclosed teachings.

In the normal processing mode of the present invention, a quiescent initial circuit state is assumed in which the timer and the event trigger are held in a reset mode. Timing within the integrated circuit is derived from a 32,768 Hz crystal-oscillator clock that maintains a rounded accuracy of +/−1%. The gains and filter characteristics within the circuitry have been selected and tested empirically, by means of ASIC emulators, for each channel. Values of absolute voltages and thresholds are in reference to analog ground, which has a nominal bias voltage of approximately 1.25V. Nominal microphone sensitivity is around −56 dB, while nominal gains and center frequencies for each of the three acoustic channels are as follows:

| Low-frequency: | FLXA | 45.6 dB (190x) at 22 Hz |
| Medium-frequency: | BP1A | 23.9 dB (15.6x) at 3.95 kHz |
| High-frequency: | BP2A | 38.6 dB (84.7x) at 13 kHz |

The gains described above are only for a specific enclosure in a preferred embodiment. Various enclosures will have gains adjusted according to the specific acoustic differences relative to the nominal enclosure which utilize the preceeding empirically determined gains.

Properly identifying and validating a glass-breakage event initially requires meeting the conditions of a valid event trigger. The valid event trigger conditions are identical whether using signal processing methods "A" or "B". An event trigger occurs when an acoustic event is of sufficient amplitude within the medium-frequency band-pass channel BP1A, for example a signal of 93 dB SPL at 3.8 kHz, so as to exceed a predetermined threshold Trigger_Threshold of about +/−100 mV at the medium-frequency band-pass (BP1A) comparators. The trigger circuit upon recognizing the crossing raises the event trigger to bring the timer out of a reset state, whereupon all algorithmic timing is then referenced from that event trigger.

4.1. Signal Processing Method "A"

A received set of acoustical waveforms requires qualification prior to acceptance as a valid framed glass-breakage event. Qualification requires meeting each of the following criteria:

Dual-trigger=((BP2A_N or BP2A_P)>100 mV)*4<977.mu.S

Within the Dual_Trigger_Interval of approximately 977 .mu.S, which commences from the event trigger, a number of pulses Dual_trigger_Min_Count, set nominally at four pulses, must be registered over the threshold BP2_Threshold, on one of the BP2 event comparators having a 100 mV absolute value threshold. If the FLEX signal is validated prior to the Dual_Trigger_Interval of approximately 977 .mu.S, then the BP2A channel is evaluated such that the dominant portion of the incoming signal is in phase with the FLEX signal. This requirement is referred to as the high-frequency dual-trigger.

BAV validation=(BAV_VLD>100 mV)<977 .mu.S

Within the Dual_Trigger_Interval of approximately 977 .mu.S from the event trigger, a single threshold crossing must occur from the band-pass average voltage (BAV) comparator set with a threshold of BAV_Validation_Threshold (100 mV). This trigger requirement is referred to as BAV validation.

BAV duration=(BAV_DUR>BAV_PK/10)>4.8 ms

The BAV signal must not cross below the BAV_Duration_Threshold, which is nominally set to 10% of the peak BAV signal (thereby scaling the peak BAV signal by approximately one-tenth), during the BAV_Duration_interval which spans up to about 4.8 milliseconds from the event trigger. This requirement is referred to as BAV duration.

FLEX validation=[(FLX_N or FLX_P)>400 mV]<7.8 ms

Within a Flex_Validation_Interval, of approximately 7.8 milliseconds from the event trigger, a single threshold crossing is required from either the positive or negative flex comparators. This requirement is referred to as FLEX validation. It should be appreciated that the initial direction of FLEX is of no concern, as a valid initial flex may occur in either direction. The flex direction, however, is stored to allow for the evaluation of phase dominance for the BP1A and BP2A signals.

No Vibration (FLEX only):

vibration type 1=[ABS(PK2) and ABS(PK2')> 0.35*ABS(PK1)]<9.7 ms (a disqualifier of glass-breakage)

Figure 3:
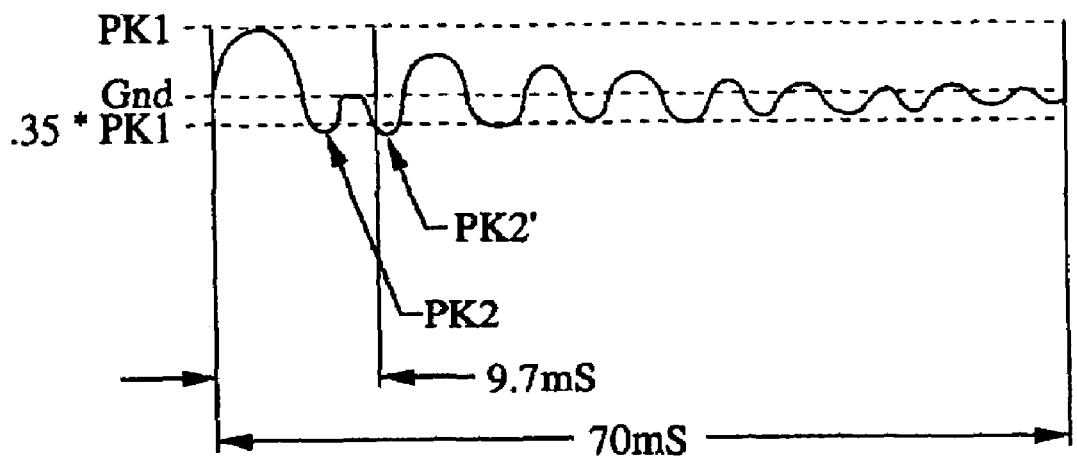
FIG. 3 is a waveform diagram commencing with a positive peak that is representative of a type 1 vibration, which is similar to an impact as defined by the ULC false alarm rejection standard, which is discriminated by Method "A" as a non-glass-breakage event according to an aspect of the present invention.

A type 1 vibration (non-glass-breakage event) is exemplified by the waveform of FIG. 3 shown with a signal which crests at voltage PK1 followed by a swing to negative amplitude troughs PK2 and PK2' which cross the absolute value threshold of 0.35*PK1 within a 9.7 ms timing-window.

Figure 4:
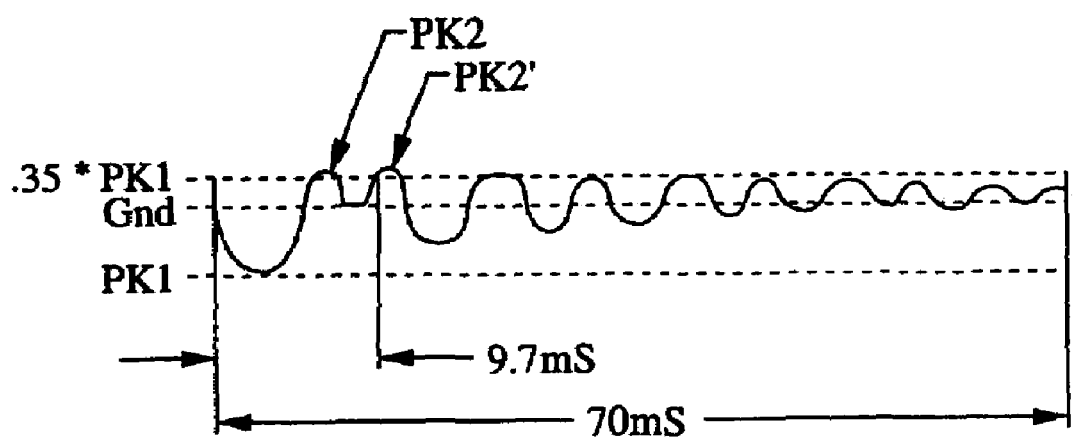
FIG. 4 is a waveform diagram commencing with a negative peak which is another representative of the type 1 vibration of FIG. 3.

For the acoustic signal to qualify as a glass-breakage event, no type 1 vibration must be present, only FLEX waveforms. This requirement is referred to as FLEX no vibration type 1. Registration as a glass-breakage event, therefore, requires that fewer than FLEX_NoVib1A_Thresh_CrossCount_Max crossings (preferably set to two) occur over the threshold FLEX_NoVib1A_ThreshPercent (preferably set to 35% of the absolute value of the first FLEX peak PK1) from the comparator (VIB_N or VIB_P) that is of the opposite polarity as the first FLEX half-cycle during a FLEX_NoVib1A_Interval (preferably of 9.7 ms). The absolute value of the first FLEX peak may be scaled by any value less than unity in performing the comparison. This requirement is referred to as FLEX, no vibration, ULC.TM. impact type 1. The waveform described may either be with a positive first peak, as shown by FIG. 3, or with a negative going first peak as shown in FIG. 4.

Identifying the presence of a type 1 vibration event within the present invention may be summarized as scaling the amplitude of a first peak by a scaling factor less than one to establish a threshold level, to which the amplitude of amplitude peaks following the first peak are compared. The signals are disqualified as glass breakage events if the amplitude of the second peak is greater than the threshold level and the second peak occurs within a time window initiated by detection of the contact force.

vibration type 2=[ABS(PK3)>ABS(PK1) and ABS (PK4)>ABS(PK1)*0.35]<70 ms (a disqualifier of glass-breakage)

BUT IF ABS(PK1) is also >800 mV (then requalifies as a glass-breakage event)

Figure 5:
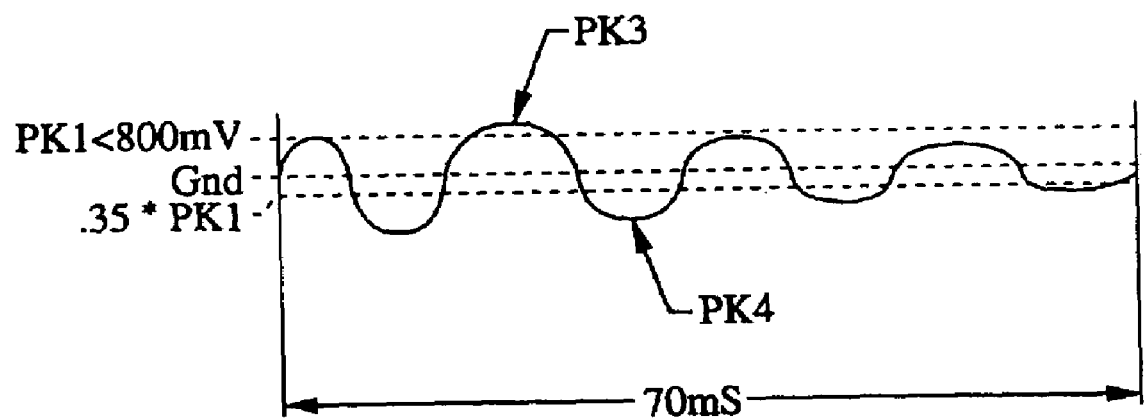
FIG. 5 is a waveform diagram commencing with a positive peak that is representative of a type 2 vibration, which is discriminated by Method "A" as a non-glass-breakage event according to an aspect of the present invention.

A type 2 vibration (non-glass-breakage event) is exemplified by the waveform of FIG. 5 shown with a signal whose first crest peaks at PK1 (which must be less than 800 mV), followed by a third crest of the same phase as the first crest that reaches a peak value of PK3 which exceeds the threshold of the first FLEX peak, PK1.

Figure 6:
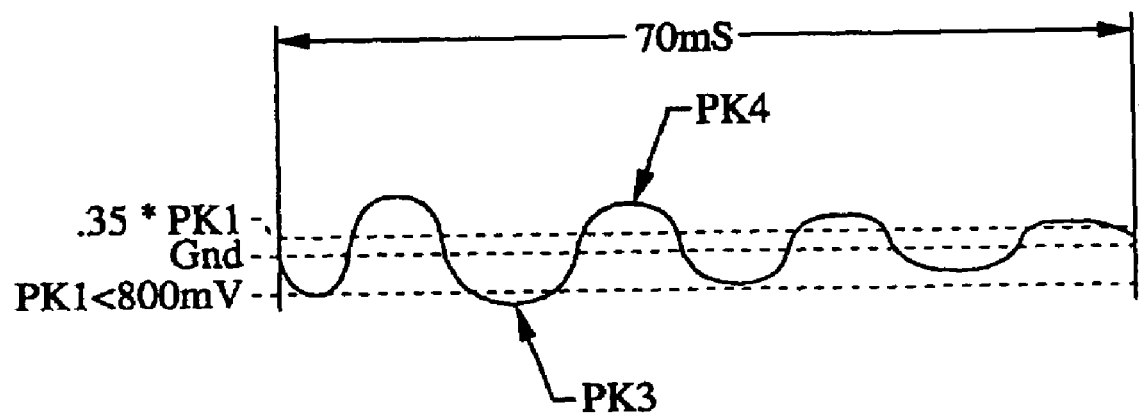
FIG. 6 is a waveform diagram commencing with a negative peak which is another representative of the type 2 vibration of FIG. 5.

For the acoustic signal to qualify as a glass-breakage event, no type 2 vibration must be present, only FLEX waveforms. This requirement is referred to as FLEX no vibration type 2. Registration as a glass-breakage event, therefore, requires that fewer than FLEX_NoVib2A_Thresh_FlxPkCrossCount_Max crossings (preferably set to one) of the same phase as the first FLEX peak, may exceed the threshold FLEX_NoVib2A_ThreshFlexPeakPercent (set nominally at 100% of the first FLEX peak) during a FLEX_NoVib2A_Interval (preferably set to approximately 70 ms from the event trigger). In addition, less than FLEX_NoVib2A_Thresh_CrossCount_Max crossings (preferably set at one), in the opposite phase as the first FLEX peak, may exceed the threshold FLEX_NoVib2A_ThreshPercent (nominally set at 35% of the absolute value of the first FLEX peak) during the same FLEX_NoVib2A_Interval. This requirement is referred to as FLEX, no vibration, type 2. The waveform described may have either a positive first peak, as shown by FIG. 5, or a negative going first peak as shown in FIG. 6.

The described type 2 vibration is considered a non-glass-breakage event unless the first half-cycle of the FLEX signal exceeds a higher predetermined threshold FLEX_HiValidationThreshold, (approximately 800 mV), in which case the vibration is allowed as a glass-breakage event, so that the detection of laminated glass-breakage is permitted while non-broken glass flexing is discriminated against.

VAC FLX=[(ABS(FLXA)>400 mV)>488 .mu.S]<1.9 ms (and before FLEX validation)

Prior to FLEX validation, the absolute value of the FLEX signal may not exceed the FLEX_ValidationThreshold of about 400 mV, for an interval beyond VACFLX_TimeOverThresh_Max which is preferably set to about 488 .mu.S, within a period of VACFLX_Precurse_Interval during a span of approximately 1.9 ms after the occurrence of the event trigger, which is represented as a threshold crossing from either polarity of the FLEX comparator. This requirement is referred to as the no VAC FLEX precursor.

Signal Amplitude Ratios:

Normal Amplifier Range: Medium Freq BP Signal/Flex Signal>2

Unamplified Range: Medium Freq BP Signal/Flex Signal>20

The signal amplitude ratios between the 4 kHz band-pass (BP1A) and the low-frequency (FLEX) channel must be consistent with the signal generated by the breaking of framed glass. Empirically determined ratios exist between the band-pass amplitudes in actual glass-breakage events which are checked within this validation test. Unamplified range refers to the second gain stage being switched down to a unity gain. The following two conditions need to be met to qualify the event according to signal amplitude ratios:

(a) Under a normal amplitude range of the BP1A channel, such as SPL=93 dB to 130 dB, the FLEX signal is required to be in excess of approximately 50% of the unamplified BP1A signal.

(b) Under a high amplitude event trigger, such as SPL>130 dB, generated by the BP1A channel, the unamplified FLEX signal is required to be in excess of approximately 5% of the unamplified BP1A signal.

4.2. Signal Processing Method "B"

Method "B" also provides a means of validating glass-breakage events and commences execution on the identical event trigger conditions described for use with method "A". Prior to accepting a set of acoustical waveforms as a valid framed glass-breakage event, the waveforms are required to meet each of the following criteria.

Dual-trigger=((BP2A_N or BP2A_P)>100 mV)*4<977 .mu.S (delayed 1.9 ms)

After a Dual_Trigger_Delay_Interval of approximately 1.9 ms from the event trigger, at least Dual_trigger_Min_Count, preferably set at four pulses, must be registered over the threshold BP2_Threshold on one of the BP2 event comparators which has a 100 mV absolute value threshold within the Dual_Trigger_Interval spanning an interval of approximately 977 .mu.S after the delay. If the FLEX signal is validated prior to the Dual_Trigger Interval, then the BP2A channel is evaluated such that the dominant part of the incoming signal is in phase with the FLEX signal. This requirement is referred to as the high-frequency dual-trigger.

BAV validation=(BAV_VLD>100 mV)<977 .mu.S

Within the Dual Trigger Interval, of approximately 977 .mu.S from the event trigger, a single threshold crossing is required from the Band-pass Average Voltage (BAV) comparator having a threshold of BAV_Validation_Threshold that is approximately 100 mV. This trigger requirement is referred to as BAV validation.

BAV duration=(BAV_DUR>BAV_PK/10)>4.8 ms

The BAV signal must not drop enough to cross the BAV_Duration_Threshold, which is nominally set for about 10% of the peak BAV signal (thereby scaling the peak BAV signal by approximately one-tenth), within a BAV_Duration_interval which preferably spans 4.8 ms from the event trigger. This requirement is referred to as BAV duration.

FLEX validation=(FLX_N or FLX_P)>400 mV]<7.8 ms

Within a Flex_Validation_Interval of approximately 7.8 ms from the event trigger, a single threshold crossing is required from either the positive or negative flex comparators. This requirement is referred to as FLEX validation. It should be appreciated that the initial direction of FLEX is not a limiting concern, as a valid initial flex in either direction is acceptable. The direction of the flex signal is stored to allow subsequent evaluation of phase dominance for the BP1A and BP2A signals.

No Vibration (FLEX only):

vibration type 1=[ABS(PK2)>0.35*ABS(PK1)]<4.8 ms (a disqualifier of glass-breakage)

Figure 7:
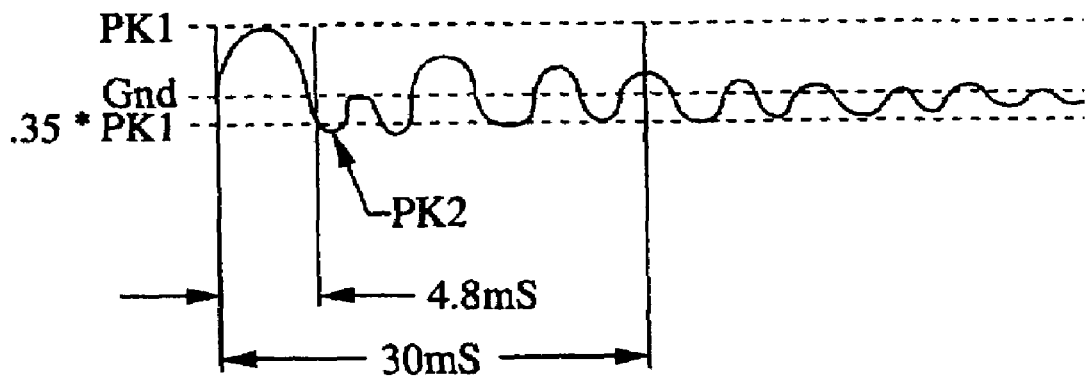
FIG. 7 is a waveform diagram commencing with a positive peak that is representative of a type 1 vibration, which is similar to an impact as defined by the ULCIM false alarm rejection standard, which is discriminated by Method "B" as a non-glass-breakage event according to an aspect of the present invention.

A type 1 vibration (non-glass-breakage event) is exemplified by the waveform of FIG. 7 shown with a signal which crests at voltage PK1 followed by a swing to a negative amplitude trough PK2 narrowly crossing the absolute value threshold of 0.35*PK1 within a 4.8 ms timing-window.

Figure 8:
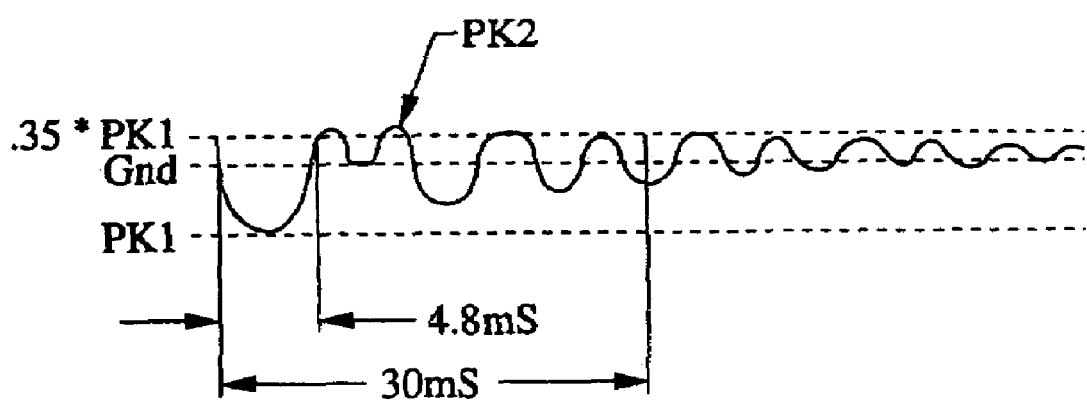
FIG. 8 is a waveform diagram commencing with a negative peak which is another representative of the type 1 vibration of FIG. 7.

For the acoustic signal to qualify as a glass-breakage event, no type 1 vibration must be present, only FLEX waveforms. This requirement is referred to as FLEX no vibration type 1. Registration as a glass-breakage event, therefore, requires that fewer than FLEX_NoVib1B_Thresh_CrossCount_Max crossings (preferably set to one) occur over the threshold FLEX_NoVib1B_ThreshPercent which is equivalent to the first FLEX peak PK1 subject to scaling by a value less than unity (preferably FLEX_NoVib1B_ThreshPercent is set to 35% of the absolute value of the first FLEX peak PK1) from the comparator (VIB_N or VIB P) that is of the opposite polarity as the first FLEX half-cycle during a FLEX_NoVib1B Interval (preferably 4.8 ms). This requirement is referred to as FLEX, no vibration, ULC.TM. impact type 1. The waveform described may either be with a positive first peak, as shown by FIG. 7, or with a negative going first peak as shown in FIG. 8.

vibration type 2=[ABS(PK3)>ABS(PK1) and ABS (PK4)>ABS(PK1)*0.35]<30 ms]

(a disqualifier of glass-breakage)

BUT IF ABS(PK1) also>800 mV (then requalifies as a glass-breakage event)

Figure 9:
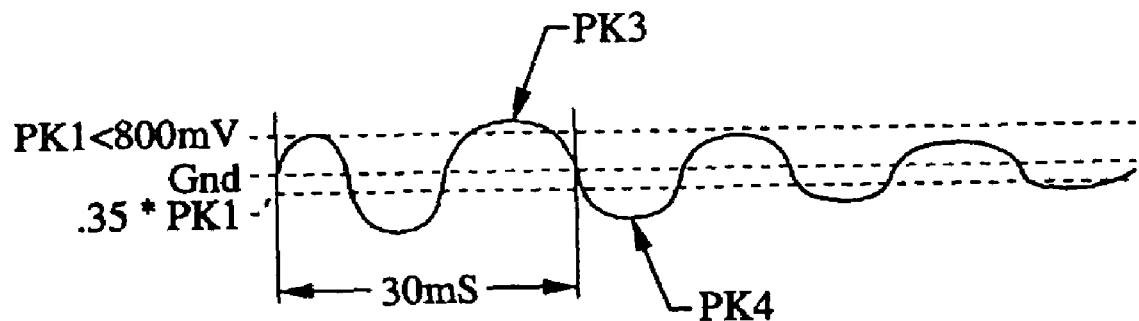
FIG. 9 is a waveform diagram commencing with a positive peak that is representative of a type 2 vibration, which is discriminated by Method "B" 55 a non-glass-breakage event according to an aspect of the present invention.

A type 2 vibration (non-glass-breakage event) is exemplified by the waveform of FIG. 9 shown with a signal whose first crest peaks at PK1 (which must be less than 800 mV), followed by a third crest of the same phase as the first crest that reaches a peak value of PK3 which exceeds the threshold of the first FLEX peak, PK1.

Figure 10:
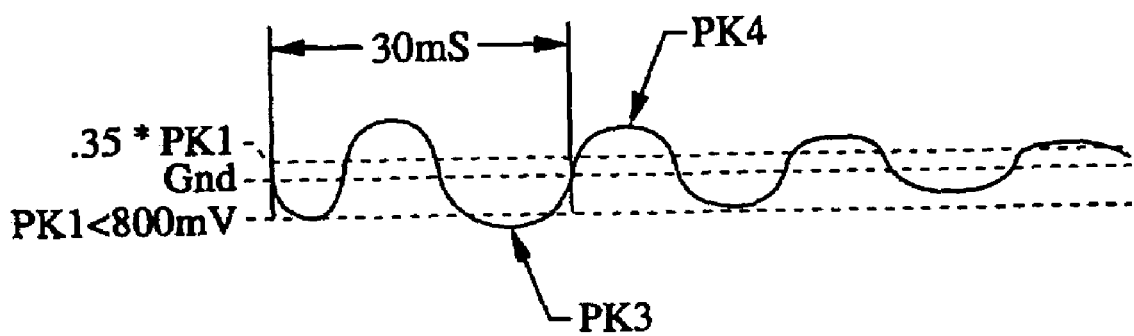
FIG. 10 is a waveform diagram commencing with a negative peak which is another representative of the type 2 vibration of FIG. 9.

For the acoustic signal to qualify as a glass-breakage event, no type 2 vibration must be present, only FLEX waveforms. This requirement is referred to as FLEX no vibration type 2. Registration as a glass-breakage event, therefore, requires that fewer than FLEX_NoVib2B_Thresh_FlxPkCrossCount_Max crossings (preferably set to one) of the same phase as the first FLEX peak, may exceed the threshold FLEX_NoVib2B_ThreshFlexPeakPercent (set nominally at 100% (full-scale) of the first FLEX peak) during a FLEX_NoVib2B_Interval (preferably set to approximately 30 Ms from the event trigger). In addition, less than FLEX_NoVib2B_Thresh_CrossCount_Max crossings (preferably set at one) of the opposite phase as the first FLEX peak, may exceed the threshold FLEX_NoVib2B_ThreshPercent, which is equivalent to the first FLEX peak PK1 subject to scaling by a value less than unity preferably set at 35% of the absolute value of the first FLEX peak) during the same FLEX_NoVib2B_Interval. This requirement is referred to as FLEX, no vibration, type 2. The waveform described may have either a positive first peak, as shown by FIG. 9, or a negative going first peak as shown in FIG. 10.

The described type 2 vibration is considered a non-glass-breakage event unless the first half-cycle of the FLEX signal exceeds a higher predetermined threshold FLEX_HiValidationThreshold, (approximately 800 mV), in which case the vibration is allowed as a glass-breakage event, so that the detection of laminated glass-breakage is permitted while non-broken glass flexing is discriminated against.

VAC FLX=[(ABS(FLXA)>400 mV>488. mu.S]<1.9 ms (and before FLEX validation)

The absolute value of the FLEX signal, prior to FLEX validation, may not exceed the FLEX_ValidationThreshold of about 400 mV for more than VACFLX_TimeOver Thresh_ Max of approximately 488. mu.S within a period of VACFLX_Precurse_Interval given by a period of about 1.9 ms after the occurrence of the event trigger, which is represented as a threshold crossing from either polarity of FLEX comparator. This requirement is referred to as the no VAC FLEX precursor.

Signal Amplitude Ratios:

Normal Amplifier Range: Medium Freq BP Signal/Flex Signal>2

Unamplified Range: Medium Freq BP Signal/Flex Signal>20

The signal amplitude ratios between the 4 kHz band-pass (BP1A) and the low-frequency (FLEX) channel need to be consistent with the signal generated by the breaking of framed glass. Unamplified range refers to the second gain stage being switched down to a unity gain. The following two conditions must be met in order to qualify the event by signal amplitude ratios:

(a) Under a normal amplitude range of the BP1A channel (such as SPL=93 dB to 130 dB) the FLEX signal is required to exceed approximately 50% of the unamplified BP1A signal.

(b) Under a high amplitude event trigger (such as SPL>130 dB) from the BP1A channel, the unamplified FLEX signal is required to exceed approximately 5% of the unamplified BP1A signal.

Accordingly it will be seen that the present invention of a glass-breakage detector and method of discriminating glass flexing provides an implementation and methods for the discrimination of breakage events registered by one or more acoustic transducers which detect an acoustic wave resulting from a contact force applied to the surface of the glass.

Numerous alternative embodiments can be implemented using various circuit technologies without departing from the underlying principles. For example, the hardware may comprise differing mixes of analog and digital hardware. The functions described may also be partitioned differently across various numbers of integrated circuits or discrete elements. In addition, the components, measurement values, and thresholds can be widely varied without departing from the inventive concepts. It will be appreciated that specified signal levels and thresholds within the description coincide with the specific characteristics of the described circuit elements, a wide variation of parameters may therefore be accommodated with according changes to the circuit which will be obvious to one of ordinary skill in the art.

5. False Alarm Differentiation with Respect to Impacts to the Surface Behind the Sensor The following relates to the capability of the method and apparatus of the present invention to prevent false alarms from occurring as the result of impacts to the surface directly behind the sensor.

False alarms which have occurred due to impacts to a beam on which a glassbreak 'sensor' is mounted, can be prevented by a microphone signal at the instant in time in which an acoustic event is detected. The microphone, which is sensitive to shock and vibration, as well acoustical energy, will respond to the shock wave originating from the impact sooner than the acoustical energy (sound waves). The shock waves originating from same impact travel faster through the solid mounting material than do the sound waves traveling through air and have a slightly different frequency content. When the impact occurs the microphone will begin responding to the shock. The preferred embodiment of the glassbreak detector that has false alarmed to this type of event begins 'event' processing when the filtered and amplified signal reaches a pre-determined threshold. In this known apparatus and method, if the un-amplified microphone signal is above a higher pre-determined threshold at the point in time that an event is detected, then the event is considered a non glassbreak impact generated false alarm.

The apparatus and method of the present invention are an improvement over existing glassbreak sensor design that is comprised of a sensing element, analog filters and operational amplifiers, digital circuitry for signal analysis, and circuitry for indicating an accepted alarm condition. In the preferred embodiment the sensing element is an electret condenser microphone (ECM) that does not have the usual FET pre-amplifier. While it is the preferred that no pre-amplifier is part of the apparatus and method, will be understood that other embodiments may include a pre-amplifier.

The nominal sensitivity of the microphone (mic) in the circuit has a sensitivity of −42 dB RE:1V/Pa. Three channels filter and amplify the microphone signal. They are nominally centered at 20 Hz, 3.9 kHz, and 13.5 kHz, with nominal gains of 45.6 dB, 23.9 dB, 38.6 dB, respectively. The 3.9 kHz channel (BP1=band-pass1) is the channel in which the start of event processing is triggered. When BP1A (band-pass 1 amplified) reaches a predetermined threshold (100 mV) event processing of all the channels, including the un-filtered and un-amplified microphone signal (MBUF1) is started. Immediately following the detection of an event trigger the MBUF1 amplitude is compared against a pre-determined threshold (analog ground−800 mV=HI_MBUF). (Which represents an impact to the surface, on which the device is mounted, from back surface of the device.) If MBUF1 is below this threshold immediately following the start of an event is detected then the event is considered a false alarm and all other processing of the event is ignored. A new event, or any signal remaining from the detected event, cannot be processed until 187 mS has elapsed since the start of the previous event.

The general rule is as follows;

If the absolute value of the microphone signal is greater than 800 mV, relative to analog ground, immediately following a mid-range band-passed amplified representation of the signal initiates the beginning of event processing, then the event is considered a false alarm and all other rules need not be applied to the signal representing this event.

The general rule above will be best understood by consideration of the following more detailed information. An impact to the support for the microphone creates a significant change in amplitude at the microphone, which transitions in the negative direction relative to a bias voltage. The threshold is set (in the preferred embodiment) at 800 mV below the bias voltage, VAGND (1.257V nominally), hence VB800 (approx.=456 mV). The microphone used in the preferred embodiment is a front electret condenser microphone that produces a negative signal in response to a positive pressure or shock stimulus. A back electret FET-less microphone may also be used, in which case the signal is in phase with the stimuli (pos=pos). The reverse of this is true when using a microphone with a FET pre-amp because the FET inverts the signal.

The High MBUF Logic 80 (comprises one block in FIG. 1. The function thereof is to detect if high levels exist on the microphone one buffer (MBUF1) immediately following, and 4.8 ms after wake-up. The theory of operation is that if the microphone buffer signal (MBUF1) is below VB800 immediately following (WAKE=1), and the HI_MBUFWB option is set to logic 0, then HI_MBUFW_Q is set to logic 1 disqualifying the event as a glass-break. If MBUF1 transitions below VB800 after wake-up, then HI_M-BUF_QB is set to logic 0, resetting, if set, the flex vibration type 1*b* (VIB_TYPE1b) bit to logic 0.

The logic description of High MBUF Logic 80 is: This block is comprised of one inverter (INV), one 2-input nor (NOR2), one 2-input nand (NAND2) and two edge trigger D-type latches (DFFR). The logic operation is: WAKE drives the clock of the first DFFR. The reset of the DFFRs is driven by the NAND2. The inputs to the NAND2 are PORB and Q12B. The relevant signals are:

| | |
|---|---|
| HI_MBUF | A pre-determined threshold which represents an impact greater than a predetermine magnitude to the surface, on which the microphone/transducer is mounted, on the side thereof remote from the side of the microphone/transducer that is most sensitive to acoustic and impact events. It is also the output of the microphone buffer comparator (MBUF1) which is compared to VB800 (VAGND-800 mV). |
| PORB | Power-On Reset inverted. All reset on PORB logic 0 (low). |
| Q12B | Inverted signal of the Q output of the 12$^{th}$ flip-flop in the timer chain. 2 to the 12$^{th}$ = clock/4096 = 8 Hz. More specifically, the first transition of Q12B to logic 0 occurs at ⅛ Hz/2 = 62.5 mS. |
| VAGND | Voltage Analog Ground or Vref (approx. 1.257 V). |
| HI_MBUFWB | the static signal which enables the high level MBUF1 processing. |
| MBUF1 | The buffered, non-inverted analog microphone signal. |
| WAKE | Digital signal that defines the wake time of the analog circuitry while it is logic 1. It is initiated upon the detection of first threshold crossing of the BP1B signal. |
| BP1B | the second stage amplifier output. It amplifies the BP1A signal. |
| BP1A | The first stage amplifying filter for the microphone (MBUF1) signal. |

At the start of an event PORB and Q12B are logic 1, the output of the NAND2 is logic 0 enabling the both DFFRs to be clocked. HI_MBUF is inverted and nored HI_MBUFWB. The NOR2 drives the D-input of the first DFFR. If HI_MBUF transitions to logic 1 while HI_MBUFWB is logic 0 the D-input will be set to logic 1. If WAKE transitions to a logic 1, while the DFFR D-input is at logic 1 the output (HI_MBUFW_Q) will be set to logic 1, disqualifying the event as a glass-break.

HI_MBUF also drives the clock of the second DFFR. When MBUF1 has transitioned below VB800, HI_MBUF transitions to logic 1, clocking the second DFFR, setting the QB output (HI_MBUF_QB) to logic 0. Q12B will transition to logic 0 4096 clock cycles (62.5 ms at CLK=32768 Hz), resetting both DFFRs.

Although the present invention has been described in terms of an ASIC those skilled in the art will recognize that in other embodiments discrete components may be utilized. Alternatively, a microprocessor and memory together with software known or obvious to those skilled the art may implement the present invention.

The present invention has been described in terms of being detection of glass breakage. Those skilled in the art will recognize that the detection of other contact sensitive materials been broken is also within the scope of the invention.

Although the description above contains much specificity, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

List of Acronyms

| Acronym | Definition |
|---|---|
| BAV | Band-pass average voltage of envelope. |
| BAVA | Amplified band-pass average voltage of envelope. |
| BAVA_DUR | Amplified band-pass average voltage of envelope duration indicator. |
| BAVA_PK | Amplified band-pass average voltage of envelope peak. |
| BP1A | Band-pass 1 amplifier stage one. |
| BP1B | Band-pass 1 amplifier stage two. |
| BP2A | Band-pass 2 amplifier stage one. |
| BP2B | Band-pass 2 amplifier stage two. |
| FLX | Flex (low-frequency) signal. |
| FLXA | Amplified flex (low-frequency) signal or flex amplifier stage one. |
| FLXB | Flex amplifier stage two. |
| HI_MBUF | A pre-determined threshold which represents an impact greater than a predetermine magnitude to the surface, on which the microphone/transducer is mounted, on the side thereof remote from the side of the microphone/transducer that is most sensitive to acoustic and impact events. It is also the output of the microphone buffer comparator (MBUF1) which is compared to VB800 (VAGND-800 mV). |
| VIBPK | Vibration peak. |
| VIB | Vibration indicator. |
| PORB | Power-On Reset inverted. All reset on PORB logic 0 (low). |
| Q12B | Inverted signal of the Q output of the $12^{th}$ flip-flop in the timer chain. 2 to the $12^{th}$ = clock/4096 = 8 Hz. More specifically, the first transition of Q12B to logic 0 occurs at ⅛ Hz/2 = 62.5 mS. |
| VAGND | Voltage Analog Ground or Vref (approx. 1.257 V). |
| HI_MBUFWB | the static signal which enables the high level MBUF1 processing. |
| MBUF1 | The buffered, non-inverted analog microphone signal. |
| WAKE | Digital signal that defines the wake time of the analog circuitry while it is logic 1. It is initiated upon the detection of first threshold crossing of the BP1B signal. |
| BP1B | the second stage amplifier output. It amplifies the BP1A signal. |
| BP1A | The first stage amplifying filter for the microphone (MBUF1) signal. |

TABLE 2

Tri-state SENS Input States

| Input | Action or Result |
|---|---|
| High | Both attenuator capacitors switched out |
| High-Z | 1.sup.st attenuator capacitor switched in (1.6-2.0 dB) |
| Low | 2.sup.nd attenuator capacitor switched in (3.5-4.0 dB) |

TABLE 3

Tri-state Mode Input States

| Input | Action or Result |
|---|---|
| High | Zone mode |
| High-Z | Normal Sensitivity |
| Low | Sensitivity reduced 3-4 dB |

TABLE 4

LED Control Input States

| Input | Action or Result |
|---|---|
| High | LEDs Disabled |
| High-Z | Smart Setup processing/LED's Enabled |
| Low | LEDs Enabled |

TABLE 5

Latch Control Input States

| Input | Action or Result |
|---|---|
| High | Hardwired mode/alarm LED non-latching |
| High-Z | Wireless mode/alarm LED non-latching |
| Low | Hardwired mode/alarm LED latching |

TABLE 6

LED States within the System

| Condition | Green LED | Red LED |
|---|---|---|
| Normal | OFF | OFF |
| Normal, event detected | Flicker | OFF |
| Normal, event detected, alarm in memory. | Flicker | Flash = 5 seconds |
| Normal, break detected | OFF | ON = 5 seconds |
| Power-up self-test | ON = 1 second | ON = 1 second |
| Trouble detected | Flash 1/second | Flash 1/second alternating |
| Low battery | Flash 1/second | Flash 1/second |
| Test mode | Flash 1/second | OFF |
| Test mode, event detected | Flicker | OFF |
| Test mode, alarm | Flash 1/second | ON = 5 seconds |

What is claimed is:

1. A method for detecting a breaking event of a contact-sensitive surface, comprising:

(a) providing an acoustic transducer and a support for the transducer;

(b) providing a detector circuit responsive to the transducer for detecting an acoustic wave resulting from a contact force applied to the surface and generating a signal representing said acoustic wave, said signal having a plurality of consecutive amplitude peaks of the same or opposite phases including first and second sequential amplitude peaks;

(c) scaling the amplitude of the first amplitude peak by a scaling factor less than one to establish a threshold level;

(d) comparing the amplitude of the second amplitude peak to the threshold level;

(e) disqualifying the contact force as a breakage event if the amplitude of the second amplitude peak is greater than the threshold level and the second amplitude peak occurs within a time window initiated by detection of the contact force; and (f) disqualifying a contact force to said support as a breakage event that relies on differentiation of the speed with which a shock wave travels through a solid material versus the speed with which an acoustic wave travels through air.

2. A method for detecting the breaking of a contact-sensitive surface, comprising:

(a) providing an acoustic transducer and a support for the transducer;

(b) providing a detector circuit responsive to the transducer for detecting an acoustic wave resulting from a contact force applied to the surface and generating a signal representing the acoustic wave, said signal having a plurality of consecutive amplitude peaks of the same or opposite phases including sequential first, second, third and fourth amplitude peaks;

(c) scaling the amplitude of the first peak by a scaling factor less than one to establish a threshold level;

(d) comparing the amplitude of the third peak with the amplitude of the first peak;

(e) comparing the amplitude of fourth peak with the threshold level;

(d) disqualifying the contact force as a breakage event if the amplitude of the third peak is greater than the amplitude of the first peak and the amplitude of the fourth peak is greater than the threshold within a time window initiated by detection of the contact force; and (e) disqualifying a contact force to said support as a breakage event that relies on differentiation of the speed with which a shock wave travels through a solid material versus the speed with which an acoustic wave travels through air.

3. A breakage detection apparatus for use with acoustical transducers to detect panel breakage, comprising:

(a) an acoustic signal processing circuit capable of receiving a signal from a first acoustical transducer which includes transducer amplifying and conditioning circuitry and is capable of measuring signal amplitudes and relationships within a set of pass-bands, wherein at least one of said pass-bands compares signal excursions within said pass-band to a scaled version of the previously detected peak of said signal excursion;

(b) a timing control circuit that commences sequence timing of a validation interval upon a sufficient signal threshold excursion and controls the acoustic signal processing circuit to validate a breakage event upon suitable waveform conditions being met whereupon a valid alarm is signaled; and means for disqualifying a contact force to said support as a breakage event that relies on differentiation of the speed with which a shock wave travels through a solid material versus the speed with which an acoustic wave travels through air.

4. A method of validating a panel-breakage event from acoustical signals generated by transducers which are received within an acoustical processing circuit, comprising the steps of:

(a) registering a predetermined minimum number of waveform cycles within a high-frequency pass-band above a first threshold which follows within a first interval after an event trigger;

(b) maintaining a sufficient average signal amplitude within a predetermined second interval following the event trigger;

(c) registering a low-frequency component of the signal having a first peak exceeding a second threshold and wherein less than a predetermined number of additional peaks may exceed a predetermined percentage of the first peak amplitude during a third interval, while not exceeding the amplitude of the first peak in the same phase or subsequently exceeding the predetermined percentage of the first peak amplitude in the opposite phase, the low-frequency component diminishing below a specified voltage threshold during a specified fourth interval;

(d) registering signal ratios of low-frequency signal component (flex) which exceed a specified percentage of a medium-frequency signal component; and (e) disqualifying a contact force to said support as a breakage event that relies on differentiation of the speed with which a shock wave travels through a solid material versus the speed with which an acoustic wave travels through air.

5. A method of validating a panel-breakage event within an acoustical detector circuit which processes acoustical signals in each of at least three pass-bands, comprising the steps of:

(a) qualifying a trigger event within a medium-frequency pass-band having an amplitude which exceeds an event threshold and commencing to time an event interval;

(b) registering a minimum sufficient number of crossings of the absolute value of the signal over a dual-trigger threshold within a high-frequency pass-band during a dual-trigger interval within the event interval;

(c) maintaining a sufficient average absolute signal level during the event interval;

(d) registering a crossing from the absolute value of low-frequency flex signal over a flex threshold within a flex interval within the event interval and recording the phase of the signal;

(e) registering within a first vibration interval less than two crossings of a threshold which is set approximately equal to 35% of the absolute value of the first low-frequency flex peak of opposite polarity to the recorded phase of the flex signal to discriminate impacts;

(f) maintaining within a second vibration interval a flex signal level below the amplitude of the same polarity as the recorded phase of the first flex signal peak and below a threshold of about 35% of first flex signal peak in the opposite polarity of the recorded signal phase to discriminate impacts;

(g) maintaining a low-frequency flex signal amplitude below a flex validation threshold for a period of less than a maximum flex interval within a validation interval within the event interval;

(h) maintaining signal amplitude ratios between the medium-frequency pass-band and the low-frequency flex signal that are consistent with that of a breaking panel;

(i) termination of the event interval and communicating a valid panel-breakage alarm if the above conditions have been met; and (j) disqualifying a contact force to said support as a breakage event that relies on differentiation of the speed with which a shock wave travels through a solid material versus the speed with which an acoustic wave travels through air.

6. An apparatus for detecting a breaking event of a contact-sensitive surface, comprising:

an acoustic, shock, and vibration transducer:
a detector circuit responsive to the transducer for detecting an acoustic wave resulting from a contact force applied to the surface and generating a signal and
a support for said transducer
means for disqualifying a contact force to said support as a breakage event that relies on differentiation of the speed with which a shock wave travels through a solid material versus the speed with which an acoustic wave travels through air.

7. The apparatus as described in claim 6 further including a microphone and wherein the means for disqualifying disqualifies the event if the absolute value of the microphone signal is greater than a predetermined value, relative to analog ground, at the instant a mid-range band-passed amplified representation of the signal initiates the beginning of event processing.

8. The apparatus as described in claim 6 wherein the transducer comprises a front electret condenser microphone that produces a negative signal in response to a positive pressure or shock stimulus.

9. The apparatus as described in claim 6 wherein the transducer cooperates with a preamplifier.

10. The apparatus as described in claim 9 wherein the preamplifier is a FET preamplifier.

11. The apparatus as described in claim 8 wherein said microphone does not have a preamplifier associated therewith.

12. The apparatus as described in claim 6 wherein the transducer comprises a back electret microphone.

13. The apparatus as described in claim 12 wherein the transducer cooperates with a preamplifier.

14. The apparatus as described in claim 12 wherein said microphone does not have a preamplifier associated therewith.

15. A method for detecting a breaking event of a contact-sensitive surface, comprising:
providing an acoustic, shock, and vibration transducer;
providing a support for the transducer;
providing a detector circuit responsive to the transducer for detecting an acoustic wave resulting from a contact force applied to the surface and generating a signal; and
providing means for disqualifying a contact force to the support as a breakage event that relies on differentiation of the speed with which a shock wave travels through a solid material versus the speed with which an acoustic wave travels through air.

16. The method as described in claim 15 wherein the means for disqualifying disqualifies the event if the absolute value of the microphone signal is greater than a predetermined value, relative to analog ground, at the instant a mid-range band-passed amplified representation of the signal initiates the beginning of event processing.

17. The method as described in claim 15 wherein the step of providing a transducer comprises providing a front electret condenser microphone that produces a negative signal in response to a positive pressure or shock stimulus.

18. The method as described in claim 17 wherein the step of providing a transducer includes providing a preamplifier that cooperates with the transducer.

19. The method as described in claim 17 wherein the step of providing a transducer includes providing a FET preamplifier that cooperates with the transducer.

20. The method as described in claim 17 wherein the step of providing a transducer does not include providing a preamplifier associated therewith.

21. The method as described in claim 15 wherein the step of providing a transducer includes providing a back electret microphone.

22. The method as described in claim 21 wherein the step of providing a transducer includes providing a preamplifier cooperating with the transducer.

23. The method as described in claim 21 wherein the step of providing a transducer that includes providing a back electret microphone and includes not having a preamplifier associated therewith.

* * * * *